US012655329B2

(12) United States Patent
Desai et al.

(10) Patent No.: US 12,655,329 B2
(45) Date of Patent: Jun. 16, 2026

(54) HOT MELT ADHESIVE AND USES THEREOF

(71) Applicant: HENKEL AG & CO., KGaA, Duesseldorf (DE)

(72) Inventors: Darshak Desai, Woodbridge, NJ (US); Yuhong Hu, Belle Mead, NJ (US)

(73) Assignee: HENKEL AG & CO. KGaA, Duesseldorf (DE)

( * ) Notice: Subject to any disclaimer, the term of this patent is extended or adjusted under 35 U.S.C. 154(b) by 634 days.

(21) Appl. No.: 18/326,383

(22) Filed: May 31, 2023

(65) Prior Publication Data

US 2023/0312998 A1      Oct. 5, 2023

Related U.S. Application Data

(63) Continuation of application No. PCT/US2021/061943, filed on Dec. 6, 2021.

(60) Provisional application No. 63/122,658, filed on Dec. 8, 2020.

(51) Int. Cl.
| *C09J 123/16* | (2006.01) |
| *C09J 5/06* | (2006.01) |
| *C09J 123/08* | (2006.01) |
| *C09J 123/14* | (2006.01) |

(52) U.S. Cl.
CPC .............. *C09J 123/16* (2013.01); *C09J 5/06* (2013.01); *C09J 123/08* (2013.01); *C09J 123/14* (2013.01)

(58) Field of Classification Search
CPC ......... B32B 5/022; B32B 5/266; B32B 27/12; B32B 27/32; B32B 2255/02; B32B 2255/10; B32B 2255/12; B32B 2255/26; B32B 29/005; B32B 29/02; C09J 5/06; C09J 7/21; C09J 7/29; C09J 11/08; C09J 2301/304; C09J 2301/312; C09J 123/08; C09J 123/12; C09J 123/14; C09J 123/16
See application file for complete search history.

(56) References Cited

U.S. PATENT DOCUMENTS

| 6,120,487 A | 9/2000 | Ashton |
| 9,695,340 B2 | 7/2017 | Saito et al. |
| 9,822,283 B2 | 11/2017 | Inoue |
| 10,265,225 B2 | 4/2019 | Beckman et al. |
| 10,563,099 B2 | 2/2020 | Chen et al. |
| 2015/0259578 A1 | 9/2015 | Jones et al. |
| 2016/0102230 A1 | 4/2016 | Gray et al. |
| 2017/0204306 A1 * | 7/2017 | Wang ...................... B32B 27/12 |
| 2017/0290945 A1 | 10/2017 | Hanson et al. |
| 2018/0244962 A1 | 8/2018 | Kanderski et al. |
| 2018/0355224 A1 | 12/2018 | Chen et al. |
| 2019/0144719 A1 | 5/2019 | Wang et al. |
| 2019/0382631 A1 | 12/2019 | Gu et al. |
| 2020/0010742 A1 † | 1/2020 | Corzani |
| 2020/0157385 A1 | 5/2020 | Kauffman et al. |
| 2020/0165495 A1 | 5/2020 | Corzani et al. |
| 2021/0214590 A1 | 7/2021 | De Jonge et al. |

FOREIGN PATENT DOCUMENTS

| JP | 2017529210 A | 10/2017 |
| JP | 2019518089 A | 6/2019 |
| JP | 2021536521 A | 12/2021 |
| WO | 2016153663 A1 | 9/2016 |
| WO | WO-2017177164 A1 * | 10/2017 | ........... A61L 15/225 |
| WO | 2020049454 A1 | 3/2020 |

OTHER PUBLICATIONS

International Search Report for PCT/US2021/061943 completed on Apr. 12, 2022, mailed Apr. 12, 2022, 4 pages.
"Product Data Sheet Vistamaxx Performance Polymer 6502 Propylene Elastomer," 1-2, Jul. 14, 2020, ExxonMobil, https://exxonmobilchemical.ulprospector.com/datasheet.aspx?I=61702&E251532&FMTPDF.†
Georjon, O., et al., "Understanding the Sprayability of Hot Melt Adhesives," 1-26, 1998, 1998 TAPPI Hot Melt Symposium Proceedings, available at https://imisrise.tappi.org/TAPPI/Products/HM/HM98141.aspx.†

* cited by examiner
† cited by third party

*Primary Examiner* — Christopher M Rodd

(74) *Attorney, Agent, or Firm* — Sun Hee Thomas

(57) ABSTRACT

Hot melt adhesive compositions prepared with a mixture of propylene copolymers are disclosed. The hot melt adhesive compositions require little to no oil content while providing high cohesion and excellent adhesion to nonwoven substrates and polymeric films. The hot melt adhesive compositions are particularly suitable for manufacturing absorbent construction articles.

14 Claims, No Drawings

HOT MELT ADHESIVE AND USES THEREOF

FIELD OF THE INVENTION

The invention relates to hot melt adhesive compositions prepared with a mixture of propylene copolymers. The hot melt adhesive compositions require little to no oil content while providing high cohesion and excellent adhesion to nonwoven substrates and polymeric films. The hot melt adhesive compositions are particularly suitable for manufacturing absorbent construction articles.

BACKGROUND OF THE INVENTION

Finding the right balance of flexibility and cohesion for olefin based hot melt adhesive is difficult. To achieve this balance, various blends of polymers have been used to prepare hot melt adhesives, including a blend of hydrogenated styrenic block copolymer and alpha-olefin copolymers in US 2019/0382631 A1, a blend of a thermoplastic styrene block copolymer and a propylene homopolymer in U.S. Pat. No. 9,822,283 B2; and a blend of propylene/butene or propylene/hexene copolymer with a polybutene-1 in US 2020/0157385 A1.

Recent development of olefin catalysts has provided more economical olefins, particularly polypropylene copolymers in the market. While propylene polymers have been a candidate for hot melt adhesives, their stiff and inability to bond to substrates do not lend themselves as desirable in hot melt adhesives. Rubber-based or amorphous ethylene copolymers are added to decrease the stiffness of propylene polymers; however, finding the right balance of flexibility and cohesion for propylene-based hot melt adhesives have been challenging.

Hot melt adhesives described in US 2017/0204306 A1 and US 2019/0144719 A1 are prepared with semi-crystalline, low molecular weight propylene having a DSC melt enthalpy greater than 35 J/g. While these adhesives are designed to improve creep retention in bonding elastic film and elastic strands, they provide insufficient flexibility, and wet-out and penetration to film substrates at low coat weight.

Hot melt adhesives described in US 2016/0102230 A1 are prepared with polypropylene impact copolymer, which have greater than 90% by weight propylene having DSC melt points in the range of about 130° C. to about 165° C. However, softening points greater than 130° C. have high viscosity and they require higher application temperatures and provide limited processability.

High oil content, i.e., greater than 20 wt %, are required for hot melt adhesives prepared with propylene-based copolymer having a melt index of less than about 20 (measured at 190° C., 2.16 kg), for high viscosity, and high application temperature adhesives, as described in US 2017/0290945 A1.

There is a need in the art for propylene-based hot melt adhesives with proper balance of flexibility and cohesion, and stable adhesion performance with minimal or no oil bleed-through and migration. This invention addresses this need.

BRIEF SUMMARY OF THE INVENTION

The invention provides hot melt adhesive compositions prepared with a mixture of propylene copolymers suitable for manufacturing absorbent construction articles.

One aspect of the invention is a hot melt adhesive comprising:

(a) about 20 to about 45 wt % of a polymer mixture consisting of:
  (1) a first polypropylene-polyethylene (co) polymer having (i) a viscosity of 3,000 to 8500 cps at 190° C., (ii) a DSC heat of fusion value of less than about 15 J/g measured at 10° C./min heating rate in accordance with ASTM D3418 (iii) a DSC melting peak at about 90-145° C. measured at 10° C./min heating rate in accordance with ASTM 3418; and
  (2) a second polypropylene-polyethylene (co) polymer having (i) a melt index of about 15 to about 40 g/10 min at 2.16 kg, 190° C., ASTM D1238, (ii) a DSC heat of fusion value of less than about 15 J/g measured at 10° C./min heating rate in accordance with ASTM D3418;
  wherein the ratio of the first polypropylene-polyethylene (co) polymer to the second polypropylene-polyethylene (co) polymer is from about 1.8:1 to about 2.8:1;

(b) about 30 to about 60 wt % of a tackifier.

The hot melt adhesive has (i) a tan($\delta$) value of greater than about 30 at 140° C., 10 rad/s and (ii) a melt viscosity of about 2,000 to about 11,000 cps at 150° C., measured in accordance with ASTM 3236. The hot melt adhesive optionally has up to about 30 wt % of a wax or a polyolefin liquid plasticizer.

In another aspect, the invention is directed to a hot melt adhesive consisting essentially of:

(a) about 20 to about 45 wt % of a polymer matrix prepared from a mixture of:
  (1) a first polymer system, wherein the first polymer system has (i) a viscosity of 3,000 to 8500 cps at 190° C., (ii) a DSC heat of fusion value of less than about 15 J/g measured at 10° C./min heating rate in accordance with ASTM D3418, (iii) a DSC melting peak at about 90-145° C. measured at 10° C./min heating rate in accordance with ASTM 3418, and (iv) propylene and ethylene (co)monomers; and
  (2) at second polymer system, wherein the second polymer system has (i) a melt index of about 15 to about 40 g/10min at 2.16 kg, 190° C., ASTM D1238, (ii) a DSC heat of fusion value of less than about 15 J/g measured at 10° C./min heating rate in accordance with ASTM D3418, and (iii) propylene and ethylene (co)monomers;
  wherein the ratio of the first polymer system to the second polymer system ranges from about 1.8:1 to about 2.8:1;

(b) about 30 to about 60 wt % of a tackifier;

(c) about 10 to about 30 wt % of a wax or a polyolefin liquid plasticizer; and (d) about 0.1 to about 6 wt % of an additive selected from the group consisting of filler, antioxidant, colorant, filler, pigment, UV absorber, UV inhibitor, compatible coating for packaging purpose.

The hot melt adhesive has (i) a tan($\delta$) value of greater than about 30 at 140° C., 10 rad/s and (ii) a melt viscosity of about 2,000 to about 11,000 cps at 150° C., measured in accordance with ASTM 3236.

DETAILED DESCRIPTION OF THE INVENTION

"Absorbent article" refers to devices which absorb and contain body exudates and, more specifically, refers to devices which are placed against or in proximity to the body of the wearer to absorb and contain the various exudates discharged from the body. Exemplary absorbent articles include diapers, training pants, pull-on pant-type diapers (i.e., a diaper having a pre-formed waist opening and leg openings such as illustrated in U.S. Pat . No. 6,120,487), refastenable diapers or pant-type diapers, incontinence briefs and undergarments, diaper holders and liners, feminine hygiene garments such as panty liners, absorbent inserts, meat pads, animal pads, mask. coverall, and the like.

"Absorbent construction adhesive" refers to the adhesive that adheres the components of the absorbent article together including, absorbent pad, nonwoven, top sheet, back sheet, core-wrap, core-stabilization, and core-fixation.

"Adhesively bonded" to a substrate wherein an adhesive is used to bond a substrate (e.g., film, polymer film, elastic film, nonwoven, and tissue) or to a second similar or dissimilar substrate.

"Comprise," "comprising," and "comprises" "include(s)," "having," "has," "can," "contain(s)," and variants thereof, as used herein, are open ended terms, each specifies the presence of what follows, e.g., a component, but does not preclude the presence of other features, e.g., elements, steps, components known in the art, or disclosed herein. However, such description should be construed as also describing compositions or processes as "consisting of the enumerated ingredients/steps, which allows the presence of only the named ingredients/steps, along with any impurities that might result therefrom, and excludes other ingredients/steps.

"Consisting essentially of" and "consists essentially of" are used herein to limit the scope of subject matter, such as that in a claim, to the specified materials or steps and those that do not materially affect the basic and novel characteristics of the subject matter.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

Numerical values in the specification and claims of this application, particularly as they relate to polymers or polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values. As used herein, approximating language may be applied to modify any quantitative representation that may vary without resulting in a change in the basic function to which it is related. Accordingly, a value modified by a term or terms, such as "about," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11% ", and "about 1" may mean from 0.9-1.1. Other meanings of "about" may be apparent from the context, such as rounding off, so, for example "about 1" may also mean from 0.5 to 1.4.

The present invention provides a sprayable hot melt adhesive that can be applied at 160° C. or below. This sprayable hot melt adhesive has high green strength, and excellent bond strength and aging performance upon cooling. The sprayable hot melt adhesive may be applied at thin bond lines without bleed-through and burn-through risks for heat-sensitive substrates.

One aspect of the invention is a hot melt adhesive comprising about 20 to about 45 wt % of a polymer mixture and 30 to about 60 wt % of a tackifier. The hot melt adhesive optionally includes up to about 30 wt % of a wax or a polyolefin liquid plasticizer.

The polymer mixture consists of:

(1) a first polypropylene-polyethylene (co) polymer having (i) a viscosity of 3,000 to 8500 cps at 190° C., ASTM D3236, (ii) a DSC heat of fusion value of less than about 15 J/g measured at 10° C./min heating rate in accordance with ASTM D3418 (iii) a DSC melting peak at about 90-145° C. measured at 10° C./min heating rate in accordance with ASTM 3418; and (2) a second polypropylene-polyethylene (co) polymer having (i) a melt index of about 15 to about 40 g/10 min at 2.16 kg, 190° C., ASTM D1238, (ii) a DSC heat of fusion value of less than about 15 J/g measured at 10° C./min heating rate in accordance with ASTM D3418.

In addition, the ratio of the first polypropylene-polyethylene (co) polymer to the second polypropylene-polyethylene (co) polymer is from about 1.8:1 to about 2.8:1. Again, outside this range, the hot melt adhesive do not realize the right balance of flexibility and cohesion. Surprisingly, the combination of the two polypropylene-polyethylene (co) polymers provide flexibility and adhesion in the adhesive, even without the addition of rubber or amorphous polymers.

In another embodiment, the hot melt adhesive consists essentially of about 20 to about 45 wt % a polymer system, about 30 to about 60 wt % of a tackifier; about 10 to about 30 wt % of a wax or a plasticizer; and about 0.1 to about 6 wt % of an additive selected from the group consisting of filler, antioxidant, colorant, UV absorber, UV inhibitor, pigment, compatible coating for packaging purpose, and the like.

The polymer system is a mixture of (1) a first polymer system, wherein the first polymer system has (i) a viscosity of about 3,000 to about 8500 cps, preferably from about 5,000 to about 8,500 at 190° C., (ii) a DSC heat of fusion value of less than about 15 J/g measured at 10° C./min heating rate in accordance with ASTM D3418, (iii) a DSC melting peak at about 90-145° C. measured at 10° C./min heating rate in accordance with ASTM 3418, and (iv) propylene and ethylene (co)monomers; and (2) at second polymer system, wherein the second polymer system has (i) a melt index of about 15 to about 40 g/10min at 2.16 kg, 190° C., ASTM D1238, (ii) a DSC heat of fusion value of less than about 15 J/g measured at 10° C./min heating rate in accordance with ASTM D3418, and (iii) propylene and ethylene (co)monomers. The ratio of the first polymer system to the second polymer system ranges from about 1.8:1 to about 2.8:1.

It has been discovered that hot melt adhesive prepared with two specific polypropylene (co)polymer; and in a specific ratio of about 1.8:1 to about 2.8:1, provides flexibility for good green strength and sufficient open time. This is achieved without additional rubbers or amorphous polymers, and without paraffinic and naphthenic oil.

In one embodiment, both polypropylene (co)polymers are amorphous in nature. The heat of fusion is directly correlated to the polymer's crystallinity. Low levels of crystallinity, e.g., a DSC heat of fusion value of less than about 15 J/g measured at 10° C./min heating rate in accordance with ASTM D3418, are desirable for the polypropylene (co) polymers of the sprayable hot melt adhesive.

Suitable first polypropylene-polyethylene (co) polymer is an amorphous poly-α-olefin (APAO) polymerized prepared with Ziegler-Natta catalyst. Suitable amorphous poly-α-olefin polymers are random copolymers of propylene and ethylene monomers includes, among others, Aerafin 35 from Eastman Chemical, Aerafin 75H from Eastman Chemical, RT 2330 from REXtac LLC. Another suitable first polypropylene-polyethylene (co) polymer is an amorphous polypropylene copolymer polymerized prepared with metallocene catalyst. Commercially available metallocene catalyzed polypropylene (co)polymer suitable for use in the adhesive are Vistamaxx 8380 and Vistamaxx 8780 from ExxonMobil Chemical. Suitable second first polypropylene-polyethylene (co) polymer includes, among others, Vistamaxx 6502 from ExxonMobil Chemical. The polymer blend, with the specified viscosity/melt flow indices of the first and second polypropylene-polyethylene (co) polymers, provides the hot melt adhesives with the right balance of flexibility and cohesion.

Useful tackifying resins may include any compatible resin or mixtures thereof such as aliphatic petroleum hydrocarbon resins; aromatic petroleum hydrocarbon resins and the hydrogenated derivatives thereof; and alicyclic petroleum hydrocarbon resins and the hydrogenated derivatives thereof. Examples of hydrogenated petroleum hydrocarbon tackifiers particularly suitable include Escorez 5400 and 5300 from Exxon Mobil Chemicals, Arkon P115 from Arakawa and Eastotac 100R, 100W, Regalite S1100 and R1100 from Eastman Chemical, LUHOREZ HD 1100 from Tianjin Luhua Chemical Co. Ltd, SUKOREZ SU-100 and SU-500 from Kolon Industries, HC-100 and HS-100 from Hanwha Solutions Corp, HM1000 from Henghe Materials & Science Technology Co. Ltd; HAITACK JH 6100 from Ningbo Jinhai Chenguang Chemical Corp and the like. Also included are the cyclic or acyclic $C_5$ resins and aromatic modified acyclic or cyclic resins, Examples of commercially available $C_5$ resins include Wingtack 98, Wingtack extra, Wingtack ET from Cray Valley USA LLC, Piccotac 9095 and 1095 from Eastman Chemical, Escorez 2203 LC from Exxon Mobil Chemicals, Luhorez A1100, A2100 from Luhua Chemical Corp, Quintone R100 and C210 and S195 from Zeon Chemicals Co. Ltd. Also included are polyterpene resins; phenolic modified terpene resins and hydrogenated derivatives thereof including, for example, the resin product resulting from the condensation, in an acidic medium, of a bicyclic terpene and a phenol. Examples of commercially available modified terpene resins are Sylvares TR M1115 and TR 126 from Kraton Chemical B.V. Sylvares 6100, NG98 from Kraton Chemical B.V., TP 2040 HM and Sylvares TP 300, both available from Kraton Chemical B.V. Examples of commercially available rosins and rosin derivatives that could be used to practice the invention include SYLVALITE RE 100L and SYLVARES RE 115 available from Kraton Chemical B.V.; hydrogenated rosins and rosin derivatives such as Foral 105 from Pinova Incorporated. Other useful tackifying resins include natural and modified rosins including, for example, as gum rosin, wood rosin, tall oil rosin, distilled rosin, hydrogenated rosin, dimerized rosin, resinates, and polymerized rosin; glycerol and pentaerythritol esters of natural and modified rosins, including, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; copolymers and terpolymers of natured terpenes, including, for example, styrene/terpene and alpha methyl styrene/terpene.

Preferred tackifiers include $C_5$ resins, petroleum distillates, hydrogenated hydrocarbons, $C_5/C_9$ resins, $C_9$ resins, polyterpenes, rosins, hydrogenated rosins, rosin esters and mixtures thereof.

Also useful are aromatic hydrocarbon resins that are $C_9$ aromatic/aliphatic olefin-derived and available from Sartomer and Cray Valley under the trade name Norsolene and from Rutgers series of TK aromatic hydrocarbon resins. Norsolene 1100 is a low molecular weight thermoplastic hydrocarbon polymer commercially available from Cray Valley.

Alpha methyl styrene such as Kristalex F 115, 1120 and 5140 from Eastman Chemicals, Sylvares SA series from Arizona chemicals are also useful as tackifiers in the invention. Mixtures of two or more described tackifying resins may be required for some formulations.

Suitable waxes include paraffin waxes, microcrystalline waxes, polyethylene waxes, polypropylene waxes, by-product polyethylene waxes, Fischer-Tropsch waxes, oxidized Fischer-Tropsch waxes and functionalized waxes such as hydroxy stearamide waxes and fatty amide waxes. High density low molecular weight polyethylene waxes, by-product polyethylene waxes and Fischer-Tropsch waxes are conventionally referred to in the art as synthetic high melting point waxes. Useful waxes include polyethylene and polypropylene waxes, available as LICOCENE series such as LICOCENE PE 4201, PE3101 from Clariant Corp, LICOWAX PE 520 and LOCTAS PE 310 from Clariant Corp, Salsolwax H1 from SASOL Chemicals; Seration 1820 from SASOL Chemicals and AC series such as AC-9, AC-8, AC-820A from Honeywell International Inc and L-C 101N from Lion Chemtech Co. Ltd.

The hot melt adhesives of the present invention are substantially free of any paraffinic or naphthenic oils at room temperature. "Substantially free of" or "free of," herein, are defined as including unavoidable levels of impurities but no more. Non-oil polyolefin liquid plasticizers are suitable in the hot melt adhesives as plasticizers. Suitable polyolefin liquid plasticizers include polypropylene, polybutenes, polyisobutylene, and the like. Examples of commercially available non-oil polyolefin plasticizers are Indopol H 100, H300, H900, H1500 from INEOS Oligomers; PB 950 from Daelim Industrial Co Ltd; TPC 1105, TPC 1160 from TPC group (Texas Petrochemicals); FIB 32, FIB 24 from Braskem S.A; Licocene PPA 330 from Clariant.

The sprayable low application temperature hot melt adhesives of the present invention may desirably also contain at least one stabilizer and/or at least one antioxidant. These compounds are added to protect the adhesive from degradation caused by reaction with oxygen induced by for example, heat, light, or residual catalyst from the raw materials such as the tackifying resin.

Among the applicable stabilizers or antioxidants included herein are high molecular weight hindered phenols and multifunctional phenols such as sulfur and phosphorous-containing phenol, Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency, and correspondingly, its reactivity; this hindrance thus providing the phenolic compound with its stabilizing properties, Representative hindered phenols include; 1,3,5-trimethyl-2, 4,6-tris-(3,5-di-tert-butyl-4-hydroxybenzyl)-benzene; pentaerythrityl tetrakis-3(3,5-di-tert-butyl-4-hydroxyphenyl)-propionate; n-octadecyl-3(3,5-di-tert-butyl-4-hydroxyphenyl)-propionate; 4,4'-methylenebis(2,6-tert-butyl-phenol); 4,4'-thiobis(6-tert-butyl-o-cresol); 2,6-di-tertbutylphenol; 6-(4-hydroxyphenoxy)-2,4-bis(n-octyl-thio)-1,3,5 triazine; di-n-octylthio)ethyl 3,5-di-tert-butyl-4-hydroxy-benzoate; and sorbitol hexa[3-(3,5-di-tert-butyl-4-hydroxy-phenyl)-propionate].

Such antioxidants are commercially available from BASF and include IRGANOX® 565, 1010, 1076 and 1726 which are hindered phenols. These are primary antioxidants which act as radical scavengers and may be used alone or in combination with other antioxidants such as phosphite antioxidants like IRGAFOS® 168 available from BASF, EVER-FOS 168 from Everspring Chemical Company, Phosphite antioxidants are considered as secondary antioxidants and are not generally used alone. These are primarily used as peroxide decomposers. Other available antioxidants are CYANOX® LTDP available from Solvay and ETHANOX® 330 available from HM Royal, Evernox 10 from Everspring Chemical Company, and BNX 1010 from Mayzo. Many such antioxidants are available either to be used alone or in combination with other such antioxidants. These compounds are added to the hot melts in small amounts, typically less than about 10 wt %, and have no effect on other physical properties. Other compounds that could be added that also do not affect physical properties are pigments which add color, or fluorescing agents, to mention only a couple. Additives like these are known to those skilled in the art.

Other additives conventionally used in hot melt adhesives to satisfy different properties and meet specific application requirements also may be added to the adhesive composition of this invention. Such additives include, for example, fillers, pigments, flow modifiers, dyestuffs, ionic and non-ionic surfactants, compatible coating to protect adhesive from blocking (sticking) together for packaging purpose which may be incorporated in minor or larger amounts into the adhesive formulation, depending on the purpose.

The hot melt adhesive compositions are prepared by blending the components in a melt at a temperature of about 150 to about 180° C. to form a homogeneous blend, generally about two hours. Various methods of blending are known in the art and any method that produces a homogeneous blend may be used. The blend is then cooled and may be formed into pellets, chubs, mini-chubs, or blocks for storage or shipping as pre-formed adhesives. These pre-formed adhesives can then be reheated and melted to apply onto substrates.

The resultant hot melt adhesive has (i) a tan($\delta$) value of greater than about 30 at 140° C., 10 rad/s and (ii) a melt viscosity of about 2,000 to about 11,000 cps at 150° C., measured in accordance with ASTM 3236.

The hot melt adhesive compositions are suited for attaching absorbent construction articles, particularly hygienic absorbent construction articles including diapers, diaper pants, baby wipes, training pants, absorbent underpants, child care pants, swimwear, and other disposable garments; feminine care products including sanitary napkins, wipes, menstrual pads, panty liners, panty shields, tampons, and tampon applicators; adult-care products including wipes, pads, containers, incontinence products, and urinary shields; clothing components; athletic and recreation products; products for applying hot or cold therapy, medical gowns (i.e., protective and/or surgical gowns), surgical drapes, caps, gloves, face masks, bandages, wound dressings, wipes, covers, containers, filters, disposable garments and bed pads, medical absorbent garments, underpads; construction and packaging supplies, industrial pads including meat pads; products for cleaning and disinfecting, wipes, covers, filters, towels, bath tissue, facial tissue, nonwoven roll goods, home-comfort products including pillows, pads, cushions, masks and body care products such as products used to cleanse or treat the skin, laboratory coats, coveralls. The sprayable, low application temperature adhesive is also useful in bottle labeling or other applications involving plastic bonding or removable pressure sensitive adhesive applications.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

EXAMPLES

The invention will be described further in the following examples, which are included for purposes of illustration and are not intended, in any way, to be limiting of the scope of the invention.

Heat of fusion ($\Delta H$) and melting temperature Tm for polymers were measured by a DSC (Differential Scanning calorimeter, TAI model Q1000 DSC) at a rate of 10° C./min for both heating and cooling cycles in accordance with ASTM D3418.

Viscosity of the adhesive and polymer was measured using a standard Brookfield viscometer, spindle 27, at 140° C., 150° C., 160° C., and 190° C. in accordance with ASTM 3236.

A TA Dynamic Mechanical Analyzer (ARES-M LS) was used to obtain the tan $\delta$ using a temperature ramp test from Orchestrators software version 7.2.0.4. Steel parallel plates, 25 mm in diameter (316 Stainless Steel, Part #708-00966-1 from TA instruments) and separated by a gap of about 1 mm were used for this test. The sample was loaded and then heated to 160° C. at required temperature and the temperature ramp started once equilibrium 160° C. reached. The program measures data at every 10 second intervals. The convection oven (type ARES-LN2) was flushed continuously with cool nitrogen gas. The cooling rate is at 5° C./min until reaches 0° C. The convection oven was flushed continuously with nitrogen. The frequency was maintained at 10 rad/s. The initial strain at the start of the test was 50% (at the outer edge of the plates). An autostrain option in the software was used to maintain an accurately measurable torque throughout the test. The option was configured such that the maximum applied strain allowed by the software was 80%. The autostrain program adjusted the strain at each temperature increment, if warranted. If the torque was below 19.62× $10^{-3}$-3 Nm, the strain was decrease by 5% of the current value. If the torque was above 117.72×$10^{-3}$-3 Nm, it was decreased by 25% of the current value. At torques between 19.62×$10^{-3}$and 117.72×$10^{-3}$Nm, no change in strain was made at that temperature increment. The shear storage or elastic modulus (G') and the shear loss modulus (G") are calculated by the software from the torque and strain data. Tan δ is reported as G"/G' at 140° C., that is $$Tan\delta = G''/G' \text{ (at } 140° C.).$$

Polypropylene copolymers in adhesive samples are summarized in Table 1.

TABLE 1

| Polypropylene (co)polymer Descriptions | | | | | |
|---|---|---|---|---|---|
| Poly-mer | Trade Name | Melt Index$^a$ (g/10 min) | Brookfield Viscosity$^b$ (cps) | Melting temperature$^c$ (° C.) | Heat of fusion$^c$ (J/g) |
| 1 | VISTAMAXX 6502* | 20 | | 61.6 | 1.1 |
| 2 | Aerafin 35** | | 3300 | 105.6 | 5.0 |

TABLE 1-continued

| Polypropylene (co)polymer Descriptions | | | | | |
|---|---|---|---|---|---|
| Poly-mer | Trade Name | Melt Index$^a$ (g/10 min) | Brookfield Viscosity$^b$ (cps) | Melting temperature$^c$ (° C.) | Heat of fusion$^c$ (J/g) |
| 3 | Aerafin 75** | | 7600 | 100.3 | 3.1 |
| 4 | REXtac 2330*** | | 3000 | 141.1 | 7.8 |
| 5 | Aerafin 180** | | 18000 | 101.3 | 1.7 |
| 6 | VESTOPLAST 704**** | | 3500 | 81.6 | 6.2 |
| 7 | Aerafin 17** | | 1500 | 110.4 | 5.2 |
| 8 | Vistamaxx 8380* | | 7570 | 104.1 | 12.8 |
| 9 | L-MODU S400***** | | 8500 | 78.8 | 16.5 |

*Exxon Mobile
**Eastman Chemical
***REXtac LLC
****Evonik Industries
*****Idemitsu Kosan Co. Ltd
$^a$measured at 190° C./2.16 kg, ASTM D1238
$^b$measured 190° C., ASTM 3236
$^c$measure by DSC in accordance with ASTM D3418

Adhesive samples are shown in Table 2, as Adhesive Examples A-H. Adhesives are formulated with various polypropylene polymers with tackifiers, waxes, plasticizers, and antioxidants. HM-1000 is a hydrogenated hydrocarbon tackifier from Henghe Materials & Science Technology Co., Ltd.; Licocene PE4201 is a polyethylene wax from Clariant; Licocene PPA 330 is a polyolefin liquid plasticizer from Clariant; Evernox 10 is an antioxidant from Everspring Chemical Company.

TABLE 2

| Adhesive Examples | | | | | | | | |
|---|---|---|---|---|---|---|---|---|
| | Adhesive A | Adhesive B | Adhesive C | Adhesive D | Adhesive E | Adhesive F | Adhesive G | Adhesive H |
| Polymer 1 | 10.0 | 10.0 | 10.0 | 10.0 | 10.0 | 10.0 | 10.0 | 10.0 |
| Polymer 2 | 20.0 | | | | | | | |
| Polymer 3 | | 20.0 | | | | | | |
| Polymer 4 | | | 20.0 | | | | | |
| Polymer 5 | | | | 20.0 | | | | |
| Polymer 6 | | | | | 20.0 | | | |
| Polymer 7 | | | | | | 20.0 | | |
| Polymer 8 | | | | | | | 20 | |
| Polymer 9 | | | | | | | | 20 |
| Henghe HM 1000 | 48.0 | 48.0 | 48.0 | 48.0 | 48.0 | 48.0 | 48.0 | 48.0 |
| Licocene PE 4201 | 4.0 | 4.0 | 4.0 | 4.0 | 4.0 | 4.0 | 4.0 | 4.0 |
| Licocene PPA 330 | 17.5 | 17.5 | 17.5 | 17.5 | 17.5 | 17.5 | 17.5 | 17.5 |
| Evernox 10 | 0.5 | 0.5 | 0.5 | 0.5 | 0.5 | 0.5 | 0.5 | 0.5 |
| Total | 100 | 100 | 100 | 100 | 100 | 100 | 100 | 100 |
| Viscosity: | | | | | | | | |
| 140° C. (cps) | 6213 | 7650 | 7688 | 11130 | 6088 | 4738 | 8000 | 8475 |
| 150° C. (cps) | 4313 | 5288 | 3975 | 7700 | 4188 | 3260 | 5463 | 5763 |
| 160° C. (cps) | 3070 | 3775 | 2815 | 5475 | 2980 | 2340 | 3888 | 4063 |
| Softening Point Mettler (° C.) | 115 | 114 | 123 | 116 | 116 | 116 | 115 | 117 |
| Rheology | | | | | | | | |
| Tan δ @ 140° C. | 34.0 | 33.1 | 36.6 | 25.2 | 27.1 | 45.4 | 33.8 | 39.1 |

For each adhesive sample, the components are heated at 160° C. and combined until homogeneous. The adhesive was then applied in between two substrates to form a bonded article. Two different bonded articles were made. The first bonded article (nonwoven-to-film) was formed by bonding a breathable poly, BR149 from Clopay substrate and a 15 gsm nonwoven from PGI substrate with an adhesive sample. The second bonded article (film-to-film) was form by bonding a non-breathable polyethylene film with 0.65 mil thickness bond to another non-breathable polyethylene film with an adhesive sample. The adhesive was applied onto the substrates using a Signature Spray applicator head from Nordson Corp at 150-155° C. at a line speed of 1000 feet per minute with a coat weight of 2.5 gsm or 4 gsm. Bond strengths with corresponding adhesive sample results, both initial and aged, are shown in Table 3.

The Bond Strength for initial and aged samples was determined as:

$$\text{Bond Strength } [g/in] = \text{Average Peel Force } [g]/\text{specimen width } [in].$$

The same test was conducted for aged samples, where the sample laminates were aged for 2 weeks at 50° C. The aged samples were then equilibrated at 23°±2° C. for a minimum of one hour before testing at that same temperature. Again, a minimum of five samples was used to determine the average aged bond strength. Initial and aged bond strengths of the adhesives are reported in Table 3.

The adhesive bond strength between nonwoven-to-film and film-to-film was measured with a tensile tester in Mode I T-peel configuration for initial and aged samples, in that same temperature. The fixtures and grips were installed with light duty jaws (flat face or bar lines may be used) that are appropriately sized to the sample dimensions tested. The instrument was calibrated according to the manufacturer's instructions. The distance between the lines of gripping force (gauge length) was 1 inch, which was measured with a steel ruler held beside the grips. The force reading on the instrument was zeroed to account for the mass of the fixture and grips. The samples (2 inches wide by approximately 6 inches long) were prepared for T-peel test using the following procedure. Separate the laminate samples for approximately 1 inch at the top and tape both the poly and non-woven side. The sample was mounted into the grips in a T-peel configuration with the film portion of the T-peel sample mounted in the bottom grip and the non-woven portion of the T-peel sample mounted into the top grip. The specimen was mounted into the grips in a manner such that there is minimal slack. The crosshead moved up at a constant crosshead speed of 12 in/min and the sample was peeled until the respective materials (nonwoven fibers and film) separate completely. The force and extension data acquired at a rate of 50 Hz during the peel was measured. The peel force (gram force, gf) during the first 8 inches of extension was reported as the Mode I bond strength. A minimum of five samples was used to determine the average initial bond strength.

Preferred peel strength for the adhesive is equal to or greater than 200 gf/inch on specific substrates from both the initial and aged peel tests. In general, articles formed with adhesives having higher than 200 gf/inch provide substrate distortions and tears, which indicates failure at the substrate and not of the adhesive bonds.

TABLE 3

| Peel data from coated lamination | Adhesive A | Adhesive B | Adhesive C | Adhesive D | Adhesive E | Adhesive F | Adhesive G | Adhesive H |
|---|---|---|---|---|---|---|---|---|
| Signature Application Temperature | 165° C. | 165° C. | 177° C. | >177° C. | >177° C. | 165° C. | 168° C. | 174° C. |
| T- Peel results from Tensile Tester | | | | | | | | |
| *2.5 gsm_Initial (gf/inch) | 270 ± 17 | 252 ± 4 | 251 ± 5 | Poor pattern | Poor pattern | 198 ± 4 | 270 ± 25 | 78 ± 9 |
| *2.5 gsm_2 wks aged @ 50° C. (gf/inch) | 227 ± 7 | 247 ± 7 | 223 ± 18 | Not sprayable | Not sprayable | 176 ± 6 | 256 ± 16 | 106 ± 14 |
| **4.0 gsm_initial (gf/inch) | 153 ± 8 | 223 ± 8 | n/a | n/a | n/a | 176 ± 3 | n/a | n/a |
| **4.0 gsm_2 wks aged @ 50° C. (gf/inch) | 211 ± 4 | 320 ± 14 | n/a | n/a | n/a | 197 ± 11 | n/a | n/a |

*Substrates: breathable poly, BR149 from Clopay bond to 15 gsm nonwoven from PGI
**Substrates: non-breathable polyethylene film with 0.65 mil thickness bond to a second breathable polyethylene film with 0.65 mil thickness Sintech 1/D Tensile Testing Machine (MTS, Model 1500 BZF-50, USA). The tensile machine was fitted with a high precision 300 lb. load cell. The test samples had substantially rectilinear shape with a precision cutter from Thwing-Albert Instruments Co., Philadelphia, PA. Sample dimensions were selected to achieve the required strain with forces appropriate for the instrument. Sample dimensions were approximately 2 inches wide by approximately 6 inches long. The length of the sample was aligned with the machine direction (MD direction). The samples were equilibrated at 23° C.±2° C. for a minimum of one hour before testing at Adhesive samples A, B, C, and G provided greater than 200 gf/inch bond strength, for both initial and two-week aged samples. Sample B provided significantly higher than 200 gf/inch bond strength for both initial and aged samples on various substrates, both on nonwoven-to-film and film-to-film substrates. Their substrates became distorted and nonwoven fibers tore, for both initially and aged samples, upon testing peel strength. These adhesive samples were made with a first polypropylene-polyethylene (co) polymer having (i) a viscosity of 3,000 to 8500 cps at 190° C., (ii) a DSC heat of fusion value of less than about 15 J/g measured at 10° C./min heating rate in accordance with ASTM D3418 (iii) a DSC melting peak at about 90-145° C. measured at 10° C./min heating rate in accordance with ASTM 3418.

Adhesive samples D and E were prepared with polymers outside the desired viscosity and/or melting temperature. Their viscosities were high and provided poor adhesive patterns or were not sprayable at temperatures below 177° C.

Adhesive F was made with polymer having a viscosity lower than 3000 cps at 190° C.; and Adhesive H was made with polymer having a heat of fusion greater than about 15 J/g. Both adhesives provided lower than or borderline desired bond strength: below 200 gf/inch.

We claim:

1. A hot melt adhesive comprising:
   (a) about 20 to about 45 wt % of a polymer mixture consisting of:
      (1) a first polypropylene-polyethylene (co) polymer having (i) a viscosity of 3,000 to 8500 cps at 190° C., (ii) a DSC heat of fusion value of less than about 15 J/g measured at 10° C./min heating rate in accordance with ASTM D3418 (iii) a DSC melting peak at about 90-145° C. measured at 10° C./min heating rate in accordance with ASTM 3418; and
      (2) a second polypropylene-polyethylene (co) polymer having (i) a melt index of about 15 to about 40 g/10min at 2.16 kg, 190° C., ASTM D1238, (ii) a DSC heat of fusion value of less than about 15 J/g measured at 10° C./min heating rate in accordance with ASTM D3418;
      wherein the ratio of the first polypropylene-polyethylene (co) polymer to the second polypropylene-polyethylene (co) polymer is from about 1.8:1 to about 2.8:1;
   (b) about 30 to about 60 wt % of a tackifier; and
   (c) optionally, up to about 30 wt % of a wax or a plasticizer;
   wherein the adhesive has (i) a tan(δ) value of greater than about 30 at 140° C., 10 rad/s and (ii) a melt viscosity of about 2,000 to about 11,000 cps at 150° C., measured in accordance with ASTM 3236.

2. The hot melt adhesive of claim 1, wherein the first polypropylene-polyethylene (co) polymer is prepared with a metallocene catalyst.

3. The hot melt adhesive of claim 1, wherein the first polypropylene-polyethylene (co) polymer is prepared with Ziegler-Natta catalyst.

4. The hot melt adhesive of claim 1, wherein the first polypropylene-polyethylene (co) polymer has a viscosity of 5,000 to 8500 cps at 190° C.

5. The hot melt adhesive of claim 1, wherein the tackifier is selected from the group consisting of $C_5$ resins, petroleum distillates, hydrogenated hydrocarbons, $C_5/C_9$ resins, $C_9$ resins, polyterpenes, rosins, hydrogenated rosins, rosin esters, and mixtures thereof.

6. The hot melt adhesive of claim 1, wherein the wax is selected from the group consisting of polyethylene and polypropylene waxes.

7. The hot melt adhesive of claim 1, wherein the plasticizer is a non-oil polyolefin liquid plasticizer selected from polybutenes, polyisobutylene, polypropylene or mixtures thereof.

8. The hot melt adhesive of claim 1, wherein the hot melt adhesive is substantially free of oil.

9. The hot melt adhesive of claim 1, further comprising an additive selected from the group consisting of antioxidant, colorant, filler, UV absorber, UV inhibitor, pigment, compatible coating for packaging purpose, and mixtures thereof.

10. A hot melt adhesive consisting essentially of:
   (a) about 20 to about 45 wt % of a polymer matrix prepared from a mixture of:
      (1) a first polymer system, wherein the first polymer system has (i) a viscosity of 3,000 to 8500 cps at 190° C., (ii) a DSC heat of fusion value of less than about 15 J/g measured at 10° C./min heating rate in accordance with ASTM D3418, (iii) a DSC melting peak at about 90-145° C. measured at 10° C./min heating rate in accordance with ASTM 3418, and (iv) propylene and ethylene (co)monomers; and
      (2) at second polymer system, wherein the second polymer system has (i) a melt index of about 15 to about 40 g/10 min at 2.16 kg, 190° C., ASTM D1238, (ii) a DSC heat of fusion value of less than about 15 J/g measured at 10° C./min heating rate in accordance with ASTM D3418, and (iii) propylene and ethylene (co)monomers;
      wherein the ratio of the first polymer system to the second polymer system ranges from about 1.8:1 to about 2.8:1;
   (b) about 30 to about 60 wt % of a tackifier;
   (c) about 10 to about 30 wt % of a wax or a plasticizer; and
   (d) about 0.1 to about 6 wt % of an additive selected from the group consisting of antioxidant, colorant, filler, UV absorber, UV inhibitor, pigment, compatible coating for packaging purpose, and mixtures thereof;
   wherein the adhesive has (i) a tan(δ) value of greater than about 30 at 140° C., 10 rad/s and (ii) a melt viscosity of about 2,000 to about 11,000 cps at 150° C., measured in accordance with ASTM 3236.

11. An article comprising the adhesive of claim 1.

12. The article of claim 11, wherein the adhesive is interposed between two substrates.

13. The article of claim 12, where in the substrates are selected from the group consisting of nonwoven, polymer film, elastic film, and tissue.

14. The article of claim 11, which is a diaper, training pant, absorbent underpant, swimwear , sanitary napkin, tampon, disinfecting wipe, facial wipe, medical gown, meat pad, face mask, coverall, surgical drape, cap, glove, face mask, bandage, wound dressing, filter, bed pad, underpad, towel, bath tissue, facial tissue or animal pad.

* * * * *